United States Patent

Nevers et al.

(10) Patent No.: US 9,677,607 B2
(45) Date of Patent: Jun. 13, 2017

(54) DAMPING DEVICE FOR A SUPERCRITICAL TRANSMISSION SHAFT

(71) Applicant: AIRBUS HELICOPTERS, Marignane (FR)

(72) Inventors: Romain Nevers, Pelissanne (FR); Ludovic Aubertin, Palavas les Flots (FR); Francois Marchand, Aix en Provence (FR)

(73) Assignee: Airbus Helicopters, Marignane (FR)

( * ) Notice: Subject to any disclaimer, the term of this patent is extended or adjusted under 35 U.S.C. 154(b) by 0 days.

(21) Appl. No.: 14/595,574

(22) Filed: Jan. 13, 2015

(65) Prior Publication Data

US 2016/0200429 A1 Jul. 14, 2016

(51) Int. Cl.
| | | |
|---|---|---|
| *B60K 17/24* | (2006.01) | |
| *F16C 27/02* | (2006.01) | |
| *F16F 15/02* | (2006.01) | |
| *B64C 27/14* | (2006.01) | |

(52) U.S. Cl.
CPC .............. *F16C 27/02* (2013.01); *B64C 27/14* (2013.01); *F16F 15/021* (2013.01)

(58) Field of Classification Search
CPC . B64C 27/001; B64C 27/12; B64C 2027/002; F16C 27/02; F16F 15/021
USPC ................ 180/381; 384/192, 202, 252, 253; 244/60; 464/180
See application file for complete search history.

(56) References Cited

U.S. PATENT DOCUMENTS

| | | | | |
|---|---|---|---|---|
| 3,942,314 A | * | 3/1976 | Olowinski | ............... D01H 7/10 |
| 4,761,949 A | * | 8/1988 | Leclercq | ................... F02K 1/72 |
| | | | | 384/192 |
| 5,714,818 A | * | 2/1998 | Eakman | .................. F16C 17/02 |
| 7,771,126 B2 | * | 8/2010 | Faass | ....................... B64C 27/14 |
| 7,806,774 B2 | | 10/2010 | Manfredotti et al. | |

(Continued)

FOREIGN PATENT DOCUMENTS

DE 183798 5/1907
EP 1918198 A2 5/2008
(Continued)

OTHER PUBLICATIONS

French Search Report for FR 1302253, Completed by the French Patent Office on Jun. 13, 2014, 6 pages.
(Continued)

*Primary Examiner* — Gregory Binda
(74) *Attorney, Agent, or Firm* — Brooks Kushman P.C.

(57) ABSTRACT

A damping device for a shaft in rotation around an axis of rotation parallel to a direction (A). The said damping device includes a support, a plate, a collar, and clamping means. The said support is stationary and is provided with a first opening, with the said plate being provided with a second opening and the said collar being provided with a third opening. The said shaft passes simultaneously through the said first, second, and third openings with, respectively, a first radial gap, a second radial gap, and a third radial gap, with the said third radial gap being smaller than the said first and second radial gaps. The said collar is movable with respect to the said support in a plane perpendicular to the said direction (A), with the said clamping means pressing the said plate against the said collar and the said collar against the said support.

15 Claims, 3 Drawing Sheets

(56) References Cited

U.S. PATENT DOCUMENTS

| | | |
|---|---|---|
| 7,914,383 B2 | 3/2011 | Vignal |
| 2002/0065139 A1 | 5/2002 | Krysinski et al. |
| 2009/0067767 A1 | 3/2009 | Faass et al. |

FOREIGN PATENT DOCUMENTS

| | | |
|---|---|---|
| EP | 1918198 A3 | 5/2010 |
| EP | 2418396 | 2/2012 |
| FR | 1054332 | 2/1954 |
| FR | 2908735 | 5/2008 |
| FR | 2908736 | 5/2008 |
| PL | 196167 B1 | 12/2007 |

OTHER PUBLICATIONS

Canadian Examination Report and machine translation for corresponding Application No. 2,876,809, mailed Apr. 13, 2016, 5 pages.

\* cited by examiner

DAMPING DEVICE FOR A SUPERCRITICAL TRANSMISSION SHAFT

BACKGROUND OF THE INVENTION (1) Field of the Invention

The present invention lies in the area of mechanical power transmission means and, more specifically, in the area of mechanical power transmission means intended for rotary-wing aircraft. Yet more specifically, the present invention relates to a damping device for a supercritical mechanical power transmission shaft. This damping device makes it possible primarily to dampen the vibrations of a supercritical shaft during transitions to critical rotation speeds.

(2) Description of Related Art

A rotary-wing aircraft usually includes at least one main rotor, ensuring the support and propulsion of the aircraft, and a rear rotor, ensuring primarily an anti-torque function in yaw. Such an aircraft includes a power plant that is equipped, for example, with at least one turbo motor and that mechanically drives a main power transmission gearbox. This main power transmission gearbox directly drives the main rotor rotationally. Meanwhile, the rear rotor is rotationally driven by a rear power transmission train that, in principle, is mechanically linked to the main power transmission gearbox.

This rear power transmission train traditionally includes at least two transmission shafts leading from the main power transmission gearbox, such as, for example, a front transmission shaft and a rear transmission shaft, as well as an auxiliary power transmission gearbox that mechanically links the rear transmission shaft and the rear rotor.

The coupling of these two transmission shafts may be subject to multiple defects, consisting primarily of angular misalignment, radial misalignment, and an axial offset between these shafts.

The use of a flexible coupling makes it possible to compensate for such an angular misalignment defect. A flexible coupling, usually designated by the term "flector", consists, for example, of a stack of steel sheets. However, such an elastic coupling has no effect on radial misalignment or on an axial offset.

These transmission shafts may also be guided rotationally by bearings mounted on elastic rings that make it possible, on the one hand, to compensate for these defects, and, on the other hand, to dampen vibrations and/or the deformations of these transmission shafts. These bearings consist, for example, of ball bearings and elastic rings made of an elastomeric material.

In particular, the rear transmission shaft may be very long and may require the use of multiple intermediate bearings. Indeed, such a rear power transmission train requires the use of a large number of linking and guiding parts that may entail high cost and substantial mass. Furthermore, these defects, these vibrations, and these deformations may cause rapid deterioration of the bearings and/or of the elastic rings, thereby leading to frequent and expensive maintenance operations.

In order to eliminate the intermediate bearings and the linking parts, a long and flexible transmission shaft can be used. This shaft must be capable of withstanding significant rotational speeds imposed by the driving of the rear rotor of a rotary-wing aircraft. For example, such a transmission shaft may reach rotational speeds on the order of 2,000 revolutions per minute (2,000 rpm), or even 6,000 rpm in certain aircraft, with this transmission shaft being between 3 and 4 meters (3 and 4 m) long. In addition to the elimination of the linking and guiding parts, such a transmission shaft enables a substantial gain in terms of mass, including the mass of the shaft itself Conversely, for such transmission shafts there are specific rotational speeds that generate significant deformations. Indeed, for such rotational speeds, the centrifugal forces resulting from an imbalance of the shaft cause gradually increasing flexing of the shaft, unless this phenomenon is attenuated. The elastic restoring forces that are generated when the shaft is deformed are smaller than the centrifugal forces that are generated by the flexed shaft. The flexing of the shaft then increases until it is limited by either the physical structure surrounding the transmission shaft or the characteristics of the shaft itself.

Such phenomena can occur as soon as the rotational speed of the shaft generates vibrations that are close to each frequency of the shaft. In fact, these phenomena can appear as soon as the rotational speed of the shaft is equal to a rotational speed that corresponds to each vibration mode of the shaft. Such rotational speeds of the shaft are defined, can be determined beforehand, and are known as "critical speeds". Such a mechanical power transmission shaft is usually referred to as a "supercritical shaft".

When such deformations occur, a supercritical shaft whose rotational speed is essentially equal to a critical speed has certain points along its length that do not undergo flexion (that is, they are not displaced transversely). These points are known as "nodes" or "nodal points". Conversely, the points along the supercritical shaft that are displaced transversely with the greatest amplitude constitute the so-called "bellies" of this shaft.

It is known that, in order to limit the amplitudes of the supercritical shaft during the transition to critical speeds, damping devices can be installed at the location of these bellies or in proximity to them. When a supercritical shaft that has reached a critical speed starts to depart from its axis of rotation, such damping devices make it possible, on the one hand, to limit the flexion of the shaft and, on the other hand, to dissipate the energy of this deformation. The deformation of the supercritical shaft then diminishes as its rotational speed increases, actually moving away from the critical speed.

The supercritical shaft can then achieve a rotational speed that is essentially equal to a critical speed, although this transition should be merely temporary before a higher nominal rotational speed is reached. Care is simply taken to set the nominal rotational working speed of the supercritical shaft within a range of rotational speeds that is sufficiently far removed from its critical speeds corresponding to its individual vibration modes, so as to avoid the risk of generating vibrations that would be destructive for this supercritical shaft over the long term.

For example, if the nominal rotational speed of a supercritical shaft is located between the critical speeds that correspond to the first and second individual vibration modes of this shaft, then this shaft will encounter a single critical speed before reaching its nominal rotational speed. Similarly, if the nominal rotational speed of a supercritical shaft is located between the critical speeds that correspond to the third and fourth individual vibration modes of this shaft, then this shaft will encounter three critical speeds before reaching its nominal rotational speed.

In such a context, a known type of damping device includes a stationary support and a disc that are provided, respectively, with an annular opening through which the supercritical shaft passes. Springs press the disc against the support, with the disc being movable in a plane perpendicular to the axis of rotation of the shaft.

During the transitions to the critical speeds, the supercritical shaft, upon being deformed, comes into contact with the annular opening of the disc, with the disc then being displaced along with the shaft, which continues to be deformed. Because of friction between the disc and the support, as generated by the action of the springs, this displacement of the disc makes it possible to dissipate at least part of the energy of the deformation of the shaft. Furthermore, because the displacement of the disc is limited, the damping device also makes it possible to limit the amplitude of the deformation of the shaft.

The deformations of the supercritical shaft then diminish and disappear as the rotational speed of the shaft increases, thereby moving away from the critical speed. The disc is then re-centered in the damping device, drawn by the shaft that is re-centered around its axis of rotation.

However, a recurrent defect is encountered with this type of damping device. The supercritical shaft is in rotation when it comes into contact with the annular opening of the disc. In fact, as a result of this rotation, it induces a circular motion of the disc, which then generates an angular displacement of the disc with respect to the support around the axis of rotation of the critical shaft.

This angular displacement persists after the supercritical shaft has been re-centered around its axis of rotation, with no element of this damping device enabling the nullification of this angular displacement of the disc.

However, known document EP2418396 describes such a damping device that includes a mechanism for the complete re-centering of the disc. This damping mechanism is complex and includes an intermediate part as well as four springs. The four springs are positioned parallel to each other and perpendicular to the axis of rotation of the shaft, with two of the springs being located between the support and the disc, and two of the springs being located between the support and the intermediate plate.

Furthermore, document FR1054332 describes a bearing assembly for a rotating shaft that makes it possible, on the one hand, to oppose the oscillations and the rotational movements of the assembly around the rotating axis, and, on the other hand, to allow linear, circular, or elliptical oscillations of the bearings. In particular, these bearings include elastic means that are located in two different planes, with the said planes being perpendicular to each other.

Moreover, known documents FR2908735 and FR2908736 describe a magnetic damping device for a power transmission shaft in a helicopter. This device includes a magnetic bearing that damps the vibrations of the transmission shaft, with the said magnetic bearing being attached to the structure of the helicopter by means of a non-magnetic damper. This non-magnetic damper makes it possible to limit the radial oscillations of the magnetic damper and, consequently, those of the shaft. Document US2002/065139 also describes a magnetic damping device.

Last, document EP1918198 describes a damping device in which a damping element is located between two metal plates. Clamping assemblies consisting of a screw, a nut, and a spring make it possible to press these plates against the damping element.

Thus, the present invention relates to a damping device for a supercritical rotating shaft, which device is simultaneously simple, lightweight, and inexpensive, while enabling the effective damping of the deformations of the shaft and the correction of the angular displacement defect caused by the rotation of the shaft.

BRIEF SUMMARY OF THE INVENTION

According to the invention, a damping device for a shaft in rotation with respect to a structure around an axis of rotation parallel to a direction (A) includes:

A support that is suitable for forming an integral part of the structure, with the said support being provided with a first opening positioned perpendicular to direction (A); and A plate provided with a second opening positioned perpendicular to direction (A), with the shaft being suitable for passing simultaneously through the first opening and the second opening, with, respectively, a first radial gap ($Jr1$) with the support and a second radial gap ($Jr2$) with the plate.

This damping device is notable in that it also includes a collar and clamping means. The collar is provided with a third opening positioned perpendicular to direction (A), with the shaft being suitable for passing through the third opening, and with a third radial gap ($Jr3$) with the collar. The third radial gap ($Jr3$) is smaller than the first radial gap ($Jr1$) and the second radial gap ($Jr2$).

The collar is located between the support of the plate, and is movable with respect to the support in a plane perpendicular to direction (A). Furthermore, the plate is stationary with respect to the support. The clamping means press, in a direction parallel to direction (A), the plate against the collar and the collar against the support, with a clamping force.

In fact, the collar can be shifted in this plane perpendicular to direction (A), both rotatively around direction (A), and in translation perpendicular to direction (A). Furthermore, by pressing the plate against the collar and the collar against the support, the clamping means generate friction forces during movements of the plate, with the said forces being generated, on the one hand, between the collar and the plate, and, on the other hand, between the collar and the support.

These friction forces are a function of the clamping force applied by the clamping means and of the materials constituting the collar, the plate, and the support, as well as a function of the contact or friction surfaces between the collar, the plate, and the support.

The damping device according to the invention advantageously includes extensive friction surfaces. Indeed, these friction surfaces consist of a first friction surface between the collar and the plate, and a second friction surface between the collar and the support.

The shaft is preferably a supercritical shaft as defined hereinabove. Furthermore, the support, which is attached to the structure, is thus fixed, unlike the shaft, which is in rotation around its axis of rotation. Moreover, the shaft can be deformed, particularly when it rotates at a rotational speed that is essentially equal to one of its critical speeds.

Thus, when such deformations occur, the shaft comes into contact with the collar, because the third radial gap ($Jr3$) is smaller than the first radial gap ($Jr1$) and the second radial gap ($Jr2$). The shaft continues to be deformed, driving the displacement of the collar. The friction forces appear between, on the one hand, the collar and the plate and, on the other hand, between the collar and the support during the movements of the collar, thereby allowing these deformations of the shaft to be damped.

The size of the third radial gap ($Jr3$) is, for example, between 1 and 8 millimeters (1 and 8 mm). The size of this radial gap ($Jr3$) is preferably between 2 and 5 mm.

Then the shaft may continue to be deformed until it comes into abutment in the damping device according to the invention, if the energy driving its deformation has not been fully dissipated. This abutment may occur when the shaft comes to rest against the first opening in the support and/or against the second opening in the plate. This abutment may also occur when the plate comes to rest in a recess in the damping device. This recess may be formed in the support alone or else in the plate alone. This recess may also be formed jointly by the support and the plate.

Furthermore, the collar may also be driven rotatively by the shaft as soon as the shaft comes into contact with the collar. Thus, advantageously, the possible rotational motion of the collar makes it possible to prevent the occurrence of the phenomenon consisting of the angular displacement of the disc with respect to its support in a known damping device such as the ones described hereinabove.

In order for the damping device according to the invention to act in the same way in all directions, the collar is essentially circular and the third opening is likewise circular. The first and second openings are also circular. This collar is located in a circular recess, with a fourth radial gap (Jr4) being present radially between the collar and the recess. Next, if this fourth radial gap (Jr4) is larger than the first gap (Jr1) and the second gap (Jr2), then the deformation abutment of the shaft occurs when the shaft comes to rest against the first opening in the support and/or against the second opening in the plate. The fourth radial gap (Jr4) is preferably smaller than the first gap (Jr1) and the second gap (Jr2), in which case the abutment occurs when the collar comes to rest in the recess.

The support and the plate may, for example, be metallic, consisting of steel or aluminum, whereas the collar is made of a material that, in particular, possesses significant properties of resistance to wear and to high temperatures. In fact, the collar is displaced when it is pressed against the plate and the support by the clamping means, such that a significant increase in the temperature of the collar, of the support, and of the plate is generated due to the friction between these components.

The collar is preferably made of TORLON. TORLON is a material that is a member of the family of thermoplastic materials, and, more specifically, a polyamide-imide. TORLON possesses significant properties that allow it to replace metals under severe conditions, particularly at temperatures that may exceed 250 ° C.

Furthermore, by pressing the plate against the collar and the collar against the support in a direction parallel to direction (A), the clamping means make it possible to generate friction forces during the movements of the collar, and thereby to damp the deformations of the shaft. Thus, these clamping means make it possible to apply a clamping effort between the plate, the support, and the collar, which effort is important or even essential in terms of the effectiveness of the damping device according to the invention. Furthermore, these clamping means may also make it possible to position the plate and to secure it to the support, thereby limiting the number of components.

These clamping means consist, for example, of a plurality of screws that make it possible to apply this clamping force when they are tightened.

Conversely, when this damping device is operating, the collar, the plate, and/or the support may become worn. The clamping effort may then be diminished as a function of this wear, thereby reducing the friction forces between the collar, the plate, and the support, and thus diminishing the effectiveness of the damping device according to the invention.

The clamping means preferably include at least one instance of elastic deformable means, in order to offset this potential wear on the collar, the plate, and/or the support. In fact, a clamping force is continuously applied between the collar, the plate, and the support. For example, the clamping means may include one or more springs.

In a preferred embodiment of the invention, the clamping means consist of three sub-assemblies that are evenly distributed around the first and second openings, so that the clamping force is applied uniformly to the friction surfaces between the collar, the plate, and the support. Each sub-assembly includes a compression spring that makes it possible, for example, to apply the clamping force by means of a screw and a nut.

The clamping means can preferably be adjusted in order, for example, to adapt the clamping force so as to optimize the operation of the damping device according to the invention. The adjustment of the clamping means also makes it possible to offset any potential wear on the collar, the plate, and/or the support when this wear becomes too great. Thus, a sufficient clamping force is ensured despite this wear, so that sufficient friction forces are available to damp the deformations of the shaft.

Furthermore, when the rotational speed of the shaft moves away from one of its critical speeds, the shaft is re-centered around its axis of rotation. The collar then also returns to a centered position around this axis of rotation of the shaft, being drawn into this position by the shaft.

An optional variant of this damping device includes elastic centering means in order to facilitate the re-centering of the collar. These elastic centering means make it possible to apply a radial restoring force that moves the collar toward the axis of rotation of the shaft, thereby making it possible to counteract the friction forces during the movements of the collar, thus preventing these friction forces from opposing the re-centering of the collar and, consequently, the re-centering of the shaft.

These elastic centering means advantageously also oppose the deformations of the shaft, especially when the rotational speed of the shaft is essentially equal to one of the critical speeds of the shaft, with the collar then coming to rest against these elastic centering means and thereby deforming them. Consequently, these elastic centering means oppose this displacement of the collar and thus the deformations of the shaft, thereby also participating in the damping of these deformations of the shaft.

These elastic centering means are preferably located between the collar and its recess in the damping device according to the invention. Accordingly, these elastic centering means are located between the collar, on the one hand, and the plate and/or the support, on the other hand. These elastic centering means consist, for example, of an elastic return ring positioned radially around the collar. These elastic centering means may be placed in contact with the collar, or else a fifth radial gap (Jr5) may be present between the collar and the elastic centering means.

Accordingly, the damping device according to the invention makes it possible to damp, effectively and simply, the deformations of the shaft when it is in rotation at a speed that is essentially equal to one of its critical speeds. In fact, apart from the clamping means, this damping device consists of three major components. Furthermore, this damping device includes only one movable component, namely, the collar. Thus, the mass of the damping device according to the invention is low. Furthermore, the simplicity of this damping device makes it possible to perform maintenance operations less frequently, while also simplifying the maintenance operations themselves.

Furthermore, the structure to which the support is attached may be subject to mechanical stresses and/or vibrations that are transmitted to the shaft and that may potentially pose a threat to the mechanical strength of the shaft. Advantageously, in addition to the deformations of the shaft when it is in rotation at a speed that is essentially equal to one of its critical speeds, the damping device according to the invention advantageously makes it possible to damp, in whole or in part, these stresses and/or these vibrations.

The present invention also relates to a mechanical transmission system that includes:

A structure;

A shaft in rotation around an axis of rotation parallel to a direction (A) with respect to the structure;

At least two bearings that are attached to the structure and that guide the shaft around this axis of rotation; and At least one damping device, as previously described, attached to the structure.

The shaft in this mechanical transmission system is a supercritical shaft. Each damping device makes it possible to damp the deformations of the shaft and to limit their amplitudes. Each damping device is preferably located at a point where the amplitude of the deformations is among the greatest ones for the shaft, or else is located near such a point.

This mechanical transmission system is particularly well suited to rotatively driving a rear rotor of a rotary-wing aircraft. Thus, the shaft makes it possible to transmit mechanical power from a main power transmission gearbox, driven by a power plant on board the aircraft, to an auxiliary power transmission gearbox driving the rear rotor in rotation.

The structure of the mechanical transmission system may then consist of the tail boom of the rotary-wing aircraft. Furthermore, the length of the shaft is substantial: on the order of 3 to 4 meters. Thus, it is worthwhile for this shaft to be a supercritical shaft, on the one hand, in order to reduce its mass, and, on the other hand, to reduce the number of bearings ensuring its guidance in rotation. For example, the mass of such a supercritical shaft that is 3.5 meters long may have a mass of fewer than 5 kilograms (5 kg).

Furthermore, in addition to the deformations of the shaft when it is in rotation at a speed that is essentially equal to one of its critical speeds, the damping device advantageously makes it possible to damp, in whole or in part, the vibrations that are transmitted to the shaft by the tail boom. In fact, during flight the tail boom of this aircraft is subjected to major aerodynamic stresses and to vibrations due to the movement of the main rotor of the aircraft, which continuously deform the tail boom. Consequently, these external stresses are transmitted to the rotating shaft, and also generate potentially hazardous vibrations.

Furthermore, the support of the damping device may be attached to this tail boom. This support may also form an integral part of the tail boom, while also serving, for example, as a support for the fuselage of the boom, in order to reduce the number of components and thus the mass of the aircraft.

BRIEF DESCRIPTION OF THE SEVERAL VIEWS OF THE DRAWINGS

The invention and its advantages will become clear in greater detail within the scope of the following description, which includes examples of embodiments provided for illustrative purposes, with reference to the attached figures, among which.

Elements that appear in two or more different figures are indicated by the same reference number.

DETAILED DESCRIPTION OF THE INVENTION

Figure 1:
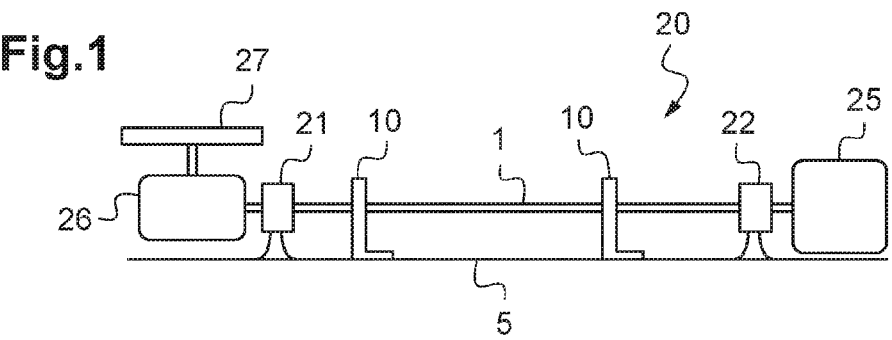
FIG. 1 is a view of a mechanical transmission system.

FIG. 1 shows a mechanical transmission system 20 rotatively driving a rotor 27 by means of an auxiliary power transmission gearbox 26. The rotor 27 is, for example, a rear rotor of a rotary-wing aircraft. This mechanical transmission system 20 includes a shaft 1 in rotation around an axis of rotation parallel to a direction (A) with respect to a stationary structure 5, as well as two bearings 21,22 that are attached to the structure 5 and two damping devices 10 that are likewise attached to the structure 5. This shaft 1 is driven in rotation by a main power transmission gearbox 25. For example, the length of this shaft 1 is substantial: on the order of 3 to 4 meters. Its rotational speed, for example, may be on the order of 2,000 rpm or even 6,000 rpm.

This shaft 1 may be a supercritical shaft. Therefore, it may be susceptible to substantial deformation when its rotational speed is essentially equal to one of its critical speeds. Such deformations are shown schematically in FIGS. 2 and 3.

Figure 2:
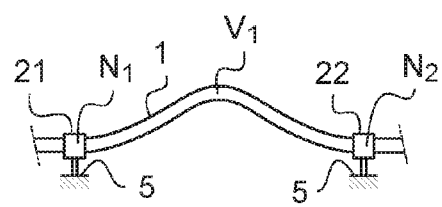
FIGS. 2 and 3 are views of the deformations of a supercritical shaft.
Figure 3:
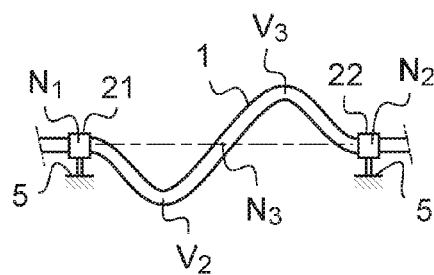

More specifically, FIG. 2 shows a supercritical shaft whose rotational speed is near the critical speed corresponding to its first individual vibration mode. This deformed supercritical shaft has two nodes $(N_1,N_2)$ in proximity to the two bearings 21,22 and one belly $(V_1)$. Conversely, FIG. 3 shows a supercritical shaft whose rotational speed is near the critical speed corresponding to its second individual vibration mode. In this case, the deformed supercritical shaft has three nodes $(N_1,N_2,N_3)$ and two bellies $(V_2,V_3)$.

As can be seen, the position of the bellies $(V_1,V_2,V_3)$, which corresponds to the points at which the deformation amplitude is the greatest, and the position of the nodes $(N_1,N_2,N_3)$, which corresponds to the points that are not deformed, vary depending on the critical speed that is reached and on each individual vibration mode of the corresponding supercritical shaft 1.

In order to damp these deformations and limit their amplitudes, the two damping devices 10 are preferably located at specific predetermined points along the supercritical shaft 1.

For example, if the nominal rotational speed of the shaft 1 is located between the critical speeds that correspond to the first and second individual vibration modes of this shaft 1, then a single damping device 10 will be necessary, and will be located in the area of the belly $(V_1)$ of the first individual vibration mode of the shaft 1.

Similarly, if the nominal rotational speed of a shaft 1 is located between the critical speeds that correspond to the second and third individual vibration modes of this shaft 1, then three damping devices 10 will make it possible to damp the deformations and the vibrations that are generated when the rotational speed of the shaft 1 is close to the critical speeds that correspond to the first and second individual vibration modes of this shaft 1. These three damping devices 10 are located in the area of the bellies $(V_1,V_2,V_3)$ of these first and second individual vibration modes of the shaft 1.

Nevertheless, two damping devices 10, as shown in FIG. 1, are sufficient for the effective damping of these deformations and these vibrations. Thus, these two damping devices 10 are located in the area of the bellies ($V_1, V_2, V_3$) of these first and second individual vibration modes of the shaft 1. For example, a first damping device 10 is located between the belly ($V_1$) of the first individual vibration mode of the shaft 1 and a first belly ($V_2$) of the second individual mode, while the second damping device 10 is located between the belly ($V_1$) of the first individual vibration mode of the shaft 1 and a second belly ($V_3$) of the second individual mode.

Figure 4:
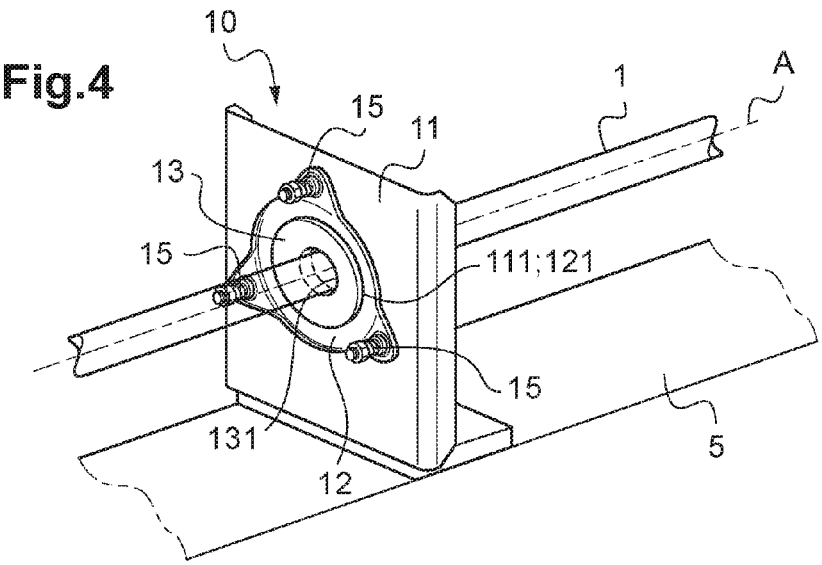
FIG. 4 is a perspective view of a damping device.
Figure 5:
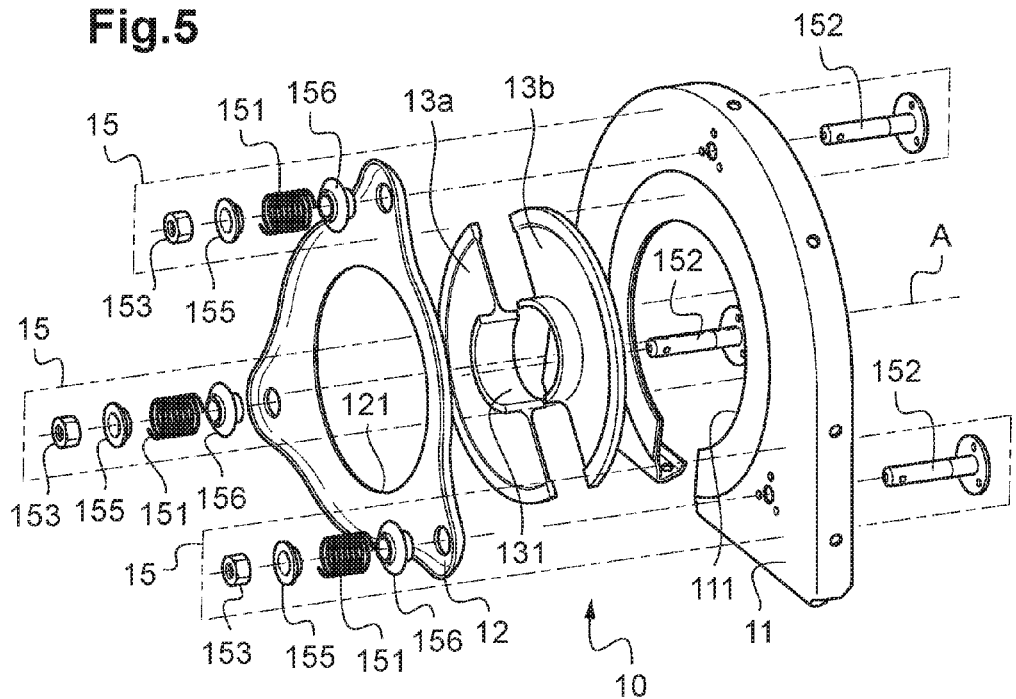
FIG. 5 is an exploded view of this damping device.
Figure 6:
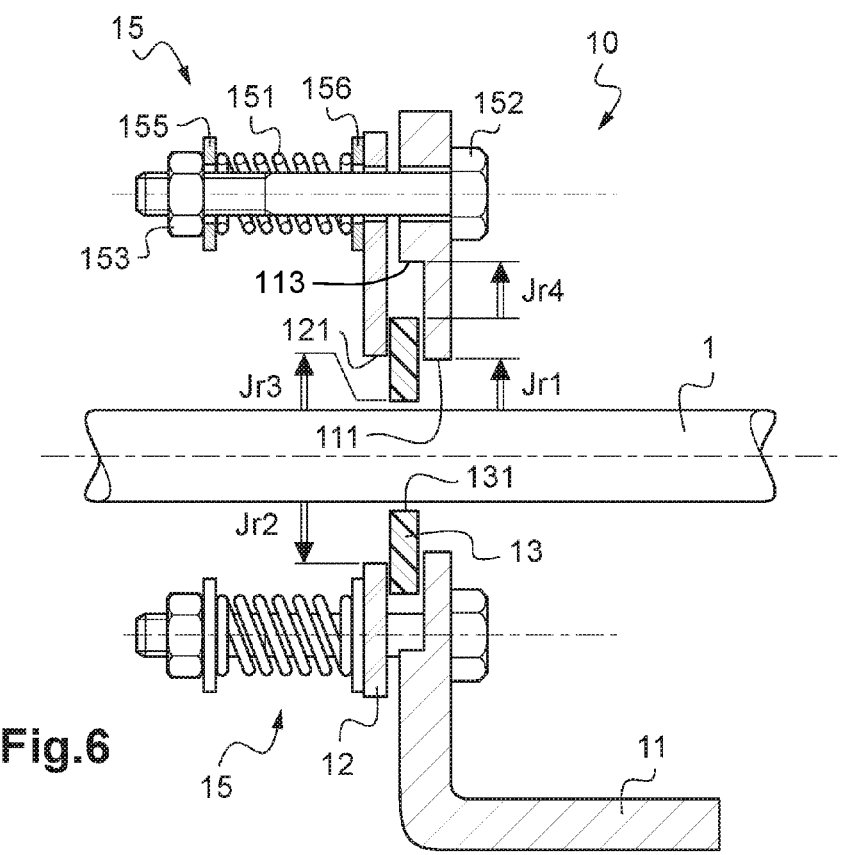
FIG. 6 is a cross-sectional view of this damping device.

FIGS. 4 through 6 show such a damping device 10 in greater detail. This damping device 10 includes a support 11 attached to the structure 5, a plate 12, a collar 13, and clamping means 15.

Figure 7:
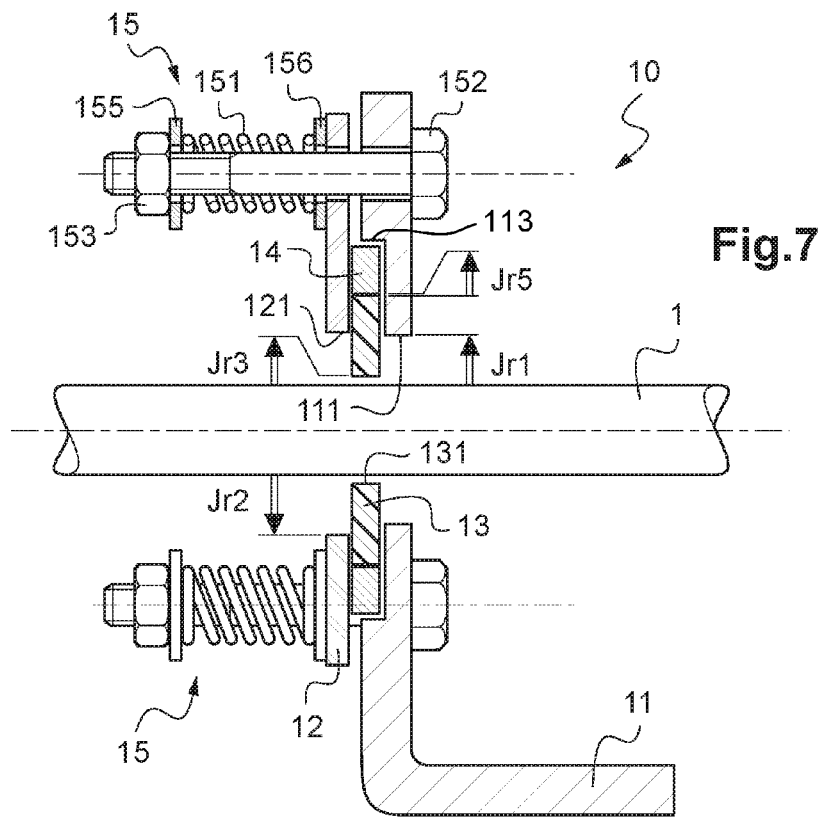
FIG. 7 is a cross-sectional view of a variant of this damping device.

The support 11 and the plate 12 are provided, respectively, with a circular first opening 111 and a circular second opening 121, which are positioned perpendicular to direction (A). The shaft 1 passes simultaneously through the first opening 111 and the second opening 121, with, respectively, a first radial gap (Jr1) with the support 11 and a second radial gap (Jr2) with the plate 12, as shown in FIG. 7. The support 11 has a circular recess 113. The plate 12 is attached to the support 11 by the clamping means 15, so as to cover the recess 113. Furthermore, the plate 12 has no degrees of freedom with respect to the support 11.

The clamping means 15 include three sub-assemblies that are evenly distributed around the first and second openings 111,121, such that the sub-assemblies form angles of 120° with the center of rotation of the first and second openings 111,121. In fact, the clamping means 15 apply a uniform clamping force to the plate 12, notably allowing this plate 12 to be secured to the support 11.

Each sub-assembly includes a compression spring 151, a screw 152, a nut 153, and two washers 155,156. The use of deformable elastic means such as the compression spring 151 makes it possible to adjust, by means of the screw 152 and the nut 153, the compression of the compression spring 151, so as to adjust the clamping force.

The collar 13 is circular and is provided with a circular third opening 131 at its center, which opening is positioned perpendicular to direction (A). The shaft 1 passes through this third opening 131, with a third radial gap (Jr3) with the collar. The third radial gap (Jr3) is smaller than the first radial gap (Jr1) and the second radial gap (Jr2). The size of the third radial gap (Jr3) is, for example, between 1 and 8 mm. The support and the plate are made of metal (for example, steel or aluminum), whereas the collar is made of TORLON.

The collar 13 is located in the recess 113 of the support 11, with a fourth radial gap (Jr4), as shown in FIG. 6, and with the plate 12 being attached to the support 11 in such a way that it rests against the collar 13. Thus, the collar 13 can be shifted in a plane that is perpendicular to direction (A) with respect to the support 11. However, the clamping means 15 press the plate against the collar and the collar against the support, in direction (A), with a clamping force.

In fact, any displacement of the collar 13, regardless of whether it consists of a rotation around direction (A) or a translation in the plane that is perpendicular to direction (A), generates friction forces between, on the one hand, the collar 13 and the plate 12, and, on the other hand, the collar 13 and the support 11.

Such displacements of the collar 13 occur with the deformations of the shaft 1 when it turns at a rotational speed that is essentially equal to one of its critical speeds. In fact, because of these deformations, the shaft 1 comes into contact with the collar 13 and drives its displacement. The collar 13 can then be displaced in translation in a plane perpendicular to direction (A), and in rotation around this direction (A). Because the collar 13 is in contact with the plate 12 and the support 11 due to the clamping force applied by the clamping means 15, the friction forces that appear make it possible to damp the deformations of the shaft 1.

These friction forces are directly linked to the clamping force applied by the clamping means 15 to the contact surfaces or to the friction surfaces between the collar 13, the plate 12, and the support 11, as well as to the materials constituting the collar 13, the plate 12, and the support 11.

Furthermore, the clamping means 15 are adjustable, which makes it possible to adjust the clamping force and, consequently, the friction forces during the movements of the collar 13. In fact, the clamping means 15 make it possible to adjust the rate at which the deformations of the shaft 1 are damped.

Furthermore, when this damping device 10 is operating, the collar 13, the plate 12, and/or the support 11 may become worn. The presence of the compression springs 151 in the clamping means 15 makes it possible to offset this wear and to preserve a sufficient clamping force in order to damp the deformations of the shaft 1.

Furthermore, in order to facilitate the replacement of this collar 13 (for example, when its replacement is required due to wear), this collar 13 may consist of two half-collars 13a,13b, as shown in FIG. 5. Accordingly, these two half-collars 13a,13b may be replaced without fully disassembling the shaft 1.

Furthermore, when the rotational speed of the shaft 1 moves away from one of its critical speeds, the shaft 1 is re-centered around its axis of rotation. The collar 13 then also returns to a centered position around this axis of rotation, being drawn into this position by the shaft 1.

Advantageously, no angular displacement of the collar 13 with respect to the support 11 appears in the damping device 10.

FIG. 7 shows a variant of a damping device 10 according to the invention that includes elastic centering means 14, such as an annular elastic return ring positioned around the collar 13, in the recess 113 in the support 11.

These elastic centering means 14 make it possible to facilitate the re-centering of the collar 13, by applying a radial restoring force that moves the collar 13 toward the axis of rotation of the shaft 1. In fact, the friction forces may oppose a return of the collar 13 to an exactly centered position around the axis of rotation of the shaft 1. Accordingly, these elastic centering means 14 make it possible to counter these friction forces.

Advantageously, these elastic centering means 14 also oppose the deformations of the shaft 1, thereby participating in the damping of the deformations of the shaft 1.

The elastic centering means 14 may be positioned with a fifth radial gap (Jr5) with respect to the collar 13, or else may be in contact with the collar 13. The fifth radial gap (Jr5) is then nil.

For example, the fifth radial gap (Jr5) may be nil when the deformation amplitudes of the shaft 1 remain low. Conversely, if these deformation amplitudes are larger, then a fifth radial gap (Jr5) may be taken into consideration in order to prevent the deterioration of the elastic centering means 14 during these major deformations of the shaft 1.

For example, slight deformations of the shaft 1 are on the order of 3 mm, and major deformations are on the order of 6 mm.

Figure 8:
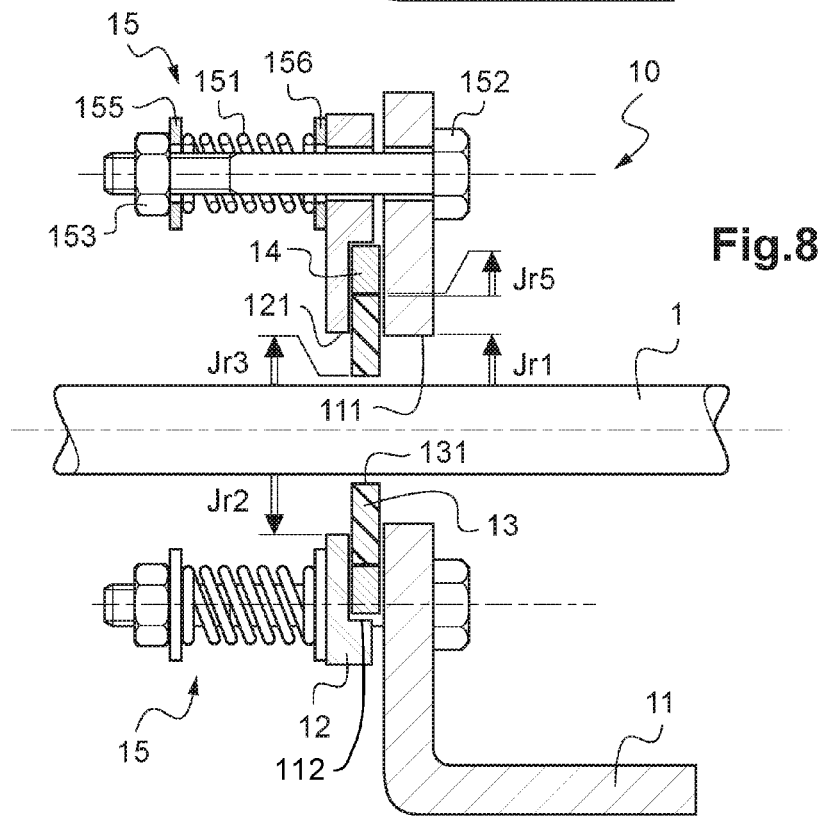
FIG. 8 is a cross-sectional view of another variant of this damping device.

FIG. 8 shows another variant of another damping device 10 according to the invention that includes elastic centering means 14, such as an annular elastic return ring positioned around the collar 13 and in a recess 112 formed by the plate 12, such that the elastic centering means 14 is located between the collar 13, on the one hand, and the plate 12, on the other hand.

Naturally, the present invention is subject to numerous variants in terms of its implementation. Although several embodiments have been described, it will be readily understood that not all of the possible modes can be identified exhaustively. Any of the means described herein may of course be replaced by equivalent means without departing from the scope of the present invention.

What is claimed is:

1. A damping device for a shaft in rotation around an axis of rotation parallel to a direction with respect to a structure, with the damping device comprising:
    a support suitable for forming an integral part of the structure, with the support being provided with a first opening positioned perpendicular to the direction, and
    a plate provided with a second opening positioned perpendicular to the direction, with the shaft being suitable for passing simultaneously through the first opening and the second opening, with, respectively, a first radial gap with the support and a second radial gap with the plate;
    a collar provided with a third opening positioned perpendicular to the direction, with the collar being positioned between the support and the plate and being movable with respect to the support in a plane perpendicular to the direction, with the shaft being suitable for passing through the third opening, with a third radial gap with the collar, with the third radial gap being smaller than the first radial gap and the second radial gap; and
    clamping means that press, parallel to the direction, the plate in direct frictional contact with the collar and the collar in direct frictional contact with the support;
    wherein the damping device includes elastic centering means positioned radially around the collar; and
    wherein the elastic centering means consist of an elastic return ring positioned radially around the collar to re-center the collar.

2. The damping device according to claim 1, wherein the third radial gap is between 1 and 8 mm.

3. The damping device according to claim 1, wherein the clamping means include at least one elastic deformable means.

4. The damping device according to claim 3, wherein the clamping means include three compression springs.

5. The damping device according to claim 1, wherein said collar is made of a polyamide-imide thermoplastic.

6. The damping device according to claim 1, wherein the support and the plate are metallic.

7. The damping device according to claim 6, wherein the support and the plate are made of aluminum.

8. The damping device according to claim 6, wherein the support and the plate are made of steel.

9. The damping device according to claim 1, wherein the elastic centering means are positioned between the collar and the plate.

10. The damping device according to claim 1, wherein the elastic centering means are positioned between the collar and the support.

11. The damping device according to claim 1, wherein the damping device is suitable for a supercritical shaft.

12. A mechanical transmission system that includes:
    a structure;
    a shaft in rotation around an axis of rotation parallel to a direction with respect to the structure; and
    at least two bearings that are attached to the structure and that guide the shaft in rotation;
    wherein the mechanical transmission system includes at least one damping device according to claim 1.

13. The mechanical transmission system according to claim 12, wherein the shaft is a supercritical shaft.

14. The mechanical transmission system according to claim 12, wherein the structure is a tail boom of a rotary-wing aircraft, with the shaft being a transmission shaft that rotationally drives a rear rotor of the aircraft.

15. The mechanical transmission system according to claim 12 wherein the shaft in deformation comes into contact with the collar to displace the collar in in translation and in rotation; and
    wherein the elastic centering means apply a radial restoring force that moves the collar toward the axis of rotation of the shaft to counteract friction forces during the displacement of the collar and to re-center the collar.

* * * * *